US 8,572,391 B2

(12) United States Patent
Golan et al.

(10) Patent No.: US 8,572,391 B2
(45) Date of Patent: Oct. 29, 2013

(54) SYSTEM AND METHOD FOR RISK BASED AUTHENTICATION

(75) Inventors: Lior Golan, Tel Aviv (IL); Amir Orad, Shoham (IL); Naftali Bennett, New York, NY (US)

(73) Assignee: EMC Corporation, Hopkinton, MA (US)

( * ) Notice: Subject to any disclaimer, the term of this patent is extended or adjusted under 35 U.S.C. 154(b) by 89 days.

(21) Appl. No.: 10/938,848

(22) Filed: Sep. 13, 2004

(65) Prior Publication Data

US 2005/0097320 A1     May 5, 2005

Related U.S. Application Data

(60) Provisional application No. 60/502,296, filed on Sep. 12, 2003.

(51) Int. Cl.
*G06F 21/00* (2013.01)

(52) U.S. Cl.
USPC ............... 713/183; 713/182; 726/1; 726/2; 726/22; 726/26; 726/34; 705/72

(58) Field of Classification Search
USPC ............ 726/1–36; 705/75, 72; 713/182, 183
See application file for complete search history.

(56) References Cited

U.S. PATENT DOCUMENTS

| | | | |
|---|---|---|---|
| 4,858,117 A * | 8/1989 | DiChiara et al. ............ 711/208 |
| 5,708,422 A * | 1/1998 | Blonder et al. ............ 340/5.41 |
| 5,819,226 A | 10/1998 | Gopinathan et al. |
| 6,049,787 A | 4/2000 | Takahashi et al. |
| 6,064,972 A * | 5/2000 | Jankowitz et al. ........... 705/7.28 |
| 6,105,010 A | 8/2000 | Musgrave |
| 6,330,546 B1 | 12/2001 | Gopinathan et al. |
| 6,496,936 B1 | 12/2002 | French et al. |
| 6,668,323 B1 * | 12/2003 | Challener et al. ............ 713/183 |
| 6,853,988 B1 * | 2/2005 | Dickinson et al. ............ 705/75 |
| 7,051,003 B1 * | 5/2006 | Kobata et al. ............ 705/51 |
| 7,107,295 B2 * | 9/2006 | Shimizu et al. ............ 1/1 |
| 7,249,112 B2 * | 7/2007 | Berardi et al. ............ 705/79 |
| 7,631,193 B1 * | 12/2009 | Hoffman ............ 713/186 |
| 2002/0082874 A1 * | 6/2002 | Go ............ 705/4 |
| 2003/0177246 A1 * | 9/2003 | Goodman et al. ............ 709/228 |
| 2003/0220835 A1 * | 11/2003 | Barnes, Jr. ............ 705/14 |
| 2004/0044621 A1 * | 3/2004 | Huang et al. ............ 705/40 |
| 2004/0083394 A1 * | 4/2004 | Brebner et al. ............ 713/202 |
| 2004/0215574 A1 * | 10/2004 | Michelsen et al. ............ 705/64 |

FOREIGN PATENT DOCUMENTS

| | | |
|---|---|---|
| EP | 0 534 673 | 3/1993 |
| EP | 1 176 489 | 1/2002 |
| EP | 1 339 199 | 8/2003 |
| JP | 11-212922 | 8/1999 |

(Continued)

OTHER PUBLICATIONS

International Search Report for International Application No. PCT/US048/29690 mailed Mar. 9, 2007.

(Continued)

*Primary Examiner* — Christopher Brown
*Assistant Examiner* — Roderick Tolentino
(74) *Attorney, Agent, or Firm* — BainwoodHuang

(57) ABSTRACT

A system and method may allow for flexible transaction processing based on for example the risk assessment of a transaction and/or a user or party to a transaction. Based on a risk level, for example, a level of authentication for the transaction may be set or altered.

46 Claims, 5 Drawing Sheets

(56) References Cited

FOREIGN PATENT DOCUMENTS

| | | |
|---|---|---|
| JP | 2002-304522 | 10/2002 |
| JP | 2003-006161 | 1/2003 |
| JP | 2003-091509 | 3/2003 |
| JP | 2003-091650 | 3/2003 |
| JP | 2003-196566 | 7/2003 |
| WO | WO 99/60482 | 11/1999 |
| WO | WO 01/22651 | 3/2001 |
| WO | WO 01/90861 | 11/2001 |

OTHER PUBLICATIONS

Supplementary European Search Report for Application No. EP 04 80 9730 dated Dec. 11, 2008.

* cited by examiner

SYSTEM AND METHOD FOR RISK BASED AUTHENTICATION

RELATED APPLICATION DATA

The present application claims benefit from prior provisional application Ser. No. 60/502,296 entitled "System And Method For Adjusting The Required Level Of Authentication", filed on Sep. 12, 2003, incorporated be reference herein in its entirety.

FIELD OF THE INVENTION

The present invention relates to authentication; more specifically the present invention may be used, for example, in authenticating parties in a transaction.

BACKGROUND

In parallel to the growth in use of online channels for accessing a variety of services, and performing a variety of transactions, identity theft has reached epidemic levels, and online account takeover and transaction fraud is growing at an enormous rate. Fraudsters have new technologies at their disposal: for example "Trojan horses" and key loggers are installed in unsuspecting customers' computers, transmitting personal information back to the fraudster; and phishing attacks trick consumers into giving up personal and financial information (for example without limitation: social security number ("SSN"), account numbers, banking information, user names and passwords for various services, personal identification number ("PIN"), credit card numbers, which may be referred to as for example "user Credentials" or "Credentials").

Recent scams indeed show a sophisticated, determined, innovative and well organized online crime wave. Fraudsters are more adaptive than ever, modifying their modus operandi and techniques quickly to exploit new vulnerabilities. While the fraudsters do not limit themselves to a specific sector, their main focus is on the banking and financial accounts sectors (other sectors prone to fraud are government services, ISPs, telecom companies and healthcare and many others).

One issue is authentication—how does a service or transaction provider indeed know whether a certain user accessing a service and performing actions at a certain site is indeed who he or she claims to be. It is clear that in today's environment using the combination of a login and password alone (which still are the most prevalent method of authentication) may not be satisfactory.

Many solutions have been proposed for the problem of authentication, however many of them encounter an imbalance between usability vs. security—they are either not secure enough, or, when security is enhanced to satisfactory levels, they are cumbersome and expensive to deploy and operate.

Various Transactions, require different types and levels of authentication from users who either wish to access or use them, or perform certain actions. Though the providers of such Transactions require different types and levels of authentication for different types of Transactions they do not require a different level of authentication for Transactions of a given type. Hence for a given type of Transaction, users are required to provide the same amount and level of authentication information, irrespectively of the risk level of the specific occurrence of authentication. For example, and without limitation, a user trying to access an online banking service, may always be required to provide the same information elements for the sake of authentication, even though the risk level associated with each transaction may be different.

Risk levels can vary among Transactions because of factors outside of the Transaction (these may be factors related to the users/potential users' profiles: for example, IP address from which user logs in, or timing of transaction), as well as factors related to the actual Transaction (these are factors mostly related to the nature of the Transaction, for example changing address, and transferring funds, might be treated as posing a greater risk of fraud, than just viewing an account balance).

While maintaining a high level of Transaction security may prevent or significantly reduce fraud, it is not costless, and might not be cost effective. Maintaining a high level of security requires demanding a greater and more complicated amount of information as part of Transaction authentication. This in turn entails a higher level of failed Transactions, due to failed authentication attempts. The reason to such failures is that the more information is required, the more likely are users to fail in their authentication attempts, usually due to lost or forgotten authentication data, which in turn is due to the complexity and/or amount of authentication data that is required.

Users, who do not succeed in authenticating themselves, may abandon the Transaction, or seek some form of customer service assistance in order to complete the authentication. Of course such customer service assistance is extremely costly.

Users who abandon a transaction may also abandon the service altogether. The opposite may also apply. Access to a service can be very easy and therefore not secure enough, both extremes, at the two ends of the binary lines are costly in terms of security or in market share. The main shortcoming of static authentication methods that exist today is this specific binary situation forcing organization to pick one of the two faulty spots—either low security coupled with a greater number of transactions, or heightened security with fewer transactions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
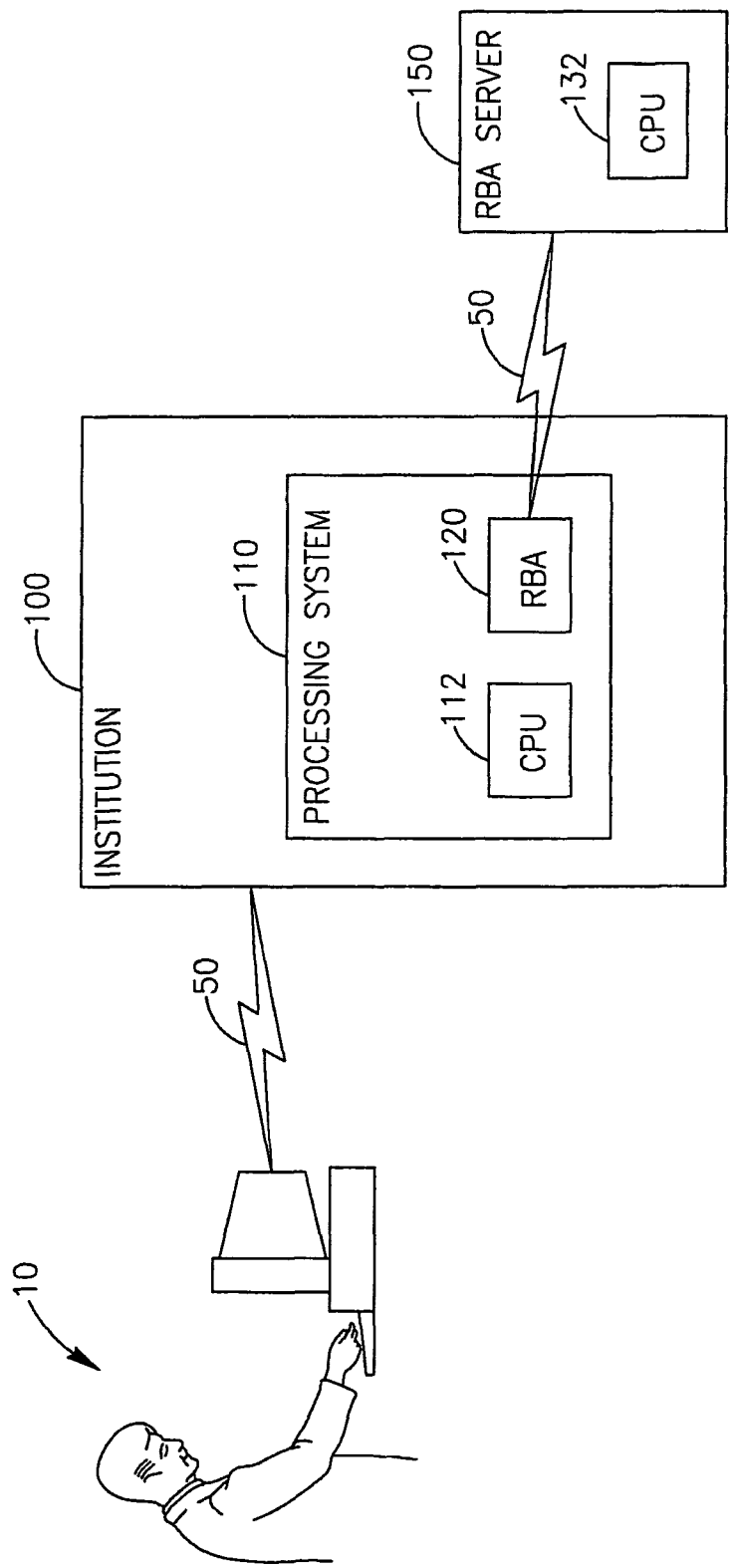
FIG. 1 depicts an authentication system according to one embodiment of the present invention.

Reference numerals may be repeated among the figures to indicate corresponding or analogous elements.

DETAILED DESCRIPTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention. Various modifications to the described embodiments will be apparent to those with skill in the art, and the general principles defined herein may be applied to other embodiments. The present invention is not intended to be limited to the particular embodiments shown and described.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices.

The processes presented herein are not inherently related to any particular computer, processing device, article or other apparatus. An example of a structure for a variety of these systems will appear from the description below. In addition, embodiments of the present invention are not described with reference to any particular processor, programming language, machine code, etc. It will be appreciated that a variety of programming languages, machine codes, etc. may be used to implement the teachings of the invention as described herein.

Some embodiments of the present invention may include a system and/or method which may provide flexible transaction processing based on for example the risk assessment or risk level of a transaction and/or a user or party to a transaction. For example, based on a risk level, a level of authentication or other aspects of a transaction may be set or altered.

FIG. 1 depicts an authentication system according to one embodiment of the present invention. Referring to FIG. 1, a user 10 using a terminal such as a personal computer, automated teller machine, telephone, cellular device, or other computing device may wish to conduct a transaction (e.g., login to a service, make a purchase, opening a financial account, etc.) with an institution 100. User 10 and institution 100 may communicate, for example, via one or more communications network(s) 50 such as, for example, the Internet, a cellular system, intranets, data lines, a combination of networks, etc. In one embodiment, institution 100 provides a web page which is displayed on the user's computer system; in such case a processor or controller executing a part of a method according to an embodiment of the invention may be located at a user 10. In some embodiments, a terminal or interface a user uses to contact the institution may be located at the institution itself, so no or possibly fewer communications networks may be needed. The institution 100 may include one or more computing systems 110, which in turn may include a processor or controller 112 and a risk based authentication local module 120. The functionality of the risk based authentication local module 120 may be substantially contained within the risk based authentication local module 120 (e.g., a self contained software module(s)), or may be partially or wholly contained elsewhere. For example, risk based authentication local module 120 may be a plug-in or a shell which may communicate (e.g., via communications network 50, or via other methods) with an external risk based authentication server 150, which may include, for example, a processor or controller 132. Risk based authentication server 150 may include all or part of the risk based authentication functionality, and may communicate with the institution 100 via the risk based authentication local module 120. Risk based authentication local module 120 may be another suitable module allowing for communication between institution 100 (or a website provided by institution 100) and an authentication server 150.

In one embodiment, a system such as the authentication server 150 or another suitable system may receive a user a request to begin a transaction, or information on a transaction and/or a user wishing to participate in the transaction (e.g., a financial transaction, opening an account, etc.), assess the risk level of a transaction; and based on the risk level, set a level of authentication for the transaction. After the level of authentication for the transaction is set, user authentication may be performed. In some embodiments, or in some modes, prior to accepting the request, user authentication details may be accepted from the user. Assessing the risk level of the transaction may be or include for example, evaluating the transaction, assessing the size of the transaction, assessing data related to the transaction, evaluating a user, evaluating the identity of the user or who the user says he or she is, evaluating the party for certain criteria, assessing the risk level of the user, assessing a general or temporary risk level, etc. Authentication may include, for example, any activity that asks the user to do something or to provide information, or which extracts information from a user, intended to prove the user identity in some way or the other. The user request or user data may be transmitted from the authentication server 150 to the institution 100, and the authentication server 150 and the institution 100 may communicate, for example via a risk based authentication local module 120, which in one embodiment may communicate with a web page provided by the institution 100 to the user, but may take on different forms. For example, a user wishing to open an account with a financial institution may have information on the user or the transaction (e.g., the size or amount of the transaction, or other information) evaluated, and based on the evaluation, the security or authentication details required in the transaction may be altered. The user wishing to complete the transaction may also be evaluated for risk, in such a case, for example, the past transaction history of the user may be evaluated. The resulting authentication level may affect the transaction. For example, the level of authentication may be used to determine a set of authentication details required of a user—for example, a password, additional information such as a social security number or answer to a security question, etc. The level of authentication may be used to choose among a set of levels of login security for the transaction, based on the risk level. This setting of the level of authentication may occur after the transaction has already started. Further, the user may have been previously or already authenticated.

In some embodiments, the type of authentication required of a user may be selected based on a risk assessment, for example, a set of authentication details among various sets, or a certain authentication mode may be chosen. Current risk assessment methods typically decide only to decline a transaction or not.

Additional or further authentication may be required based on for example a certain risk level being determined. For example, an embodiment may first authenticate a user according to a first authentication step, and then require an additional authentication step (e.g., a recent transaction number, an answer to a secret question). In response to the determination of a certain risk level, an embodiment may make mandatory or required a certain authentication step (e.g., entering a password, a transaction number), that is typically not used or is optional.

In embodiments of the current invention, the risk assessment, or security level or the level of authentication may be raised due to factors unrelated to the specific transaction or user, for example "an environmental risk" such as a current wave of cyber attacks, a government or trade group warning, etc.

In order to be able to perform stronger authentication, it may be desirable to collect high quality user data or transaction data that may be used later for risk assessment and/or for authenticating users, for example "on the fly", or during transactions. If it is determined that risk level is sufficiently low or below a certain threshold, user and/or transaction data may be collected, for example for later use. This could be done for example by presenting the user with personal questions, by collecting information about potential communication channels to such user, etc. Stronger authentication which may be used later based on collected data may involve, for example, challenging the user with additional questions based on collected data, of communicating with the user via the communication channel details supplied by the user (for example sending a new password via SMS to a mobile phone, where the phone details are collected during a transaction).

In some embodiments, a risk level may be altered, a risk level decision may be overridden, or the requirement to provide additional or any security or authentication details or the setting of an authentication level may be overridden, if the user is a certain user, or is on a certain list of users, or is in a preferred or predefined set of users, for example a VIP list, and/or if the transaction meets certain criteria. For example, certain customers (e.g., VIP customers, preferred or predefined customers, etc.) may be permitted to perform transactions and functions with no or reduced authentication. In some embodiments this may be done if for example it is determined that the risk level is low. If the user performs operations that in their nature are riskier, authentication or increased authentication may be required. For example, a certain set of banking customers may be permitted to enter an online banking site and perform basic functions without authentication if the risk is low (for example, if it is determined that a user is logging in from his or her regular computer, at a regular time of day which they usually access the service, etc.), postponing the authentication to the point in time where they perform a riskier operation (such as for example transferring a large amount of money to a different account). If an initial risk level is high, authentication may be mandated upfront. For example, if it is determined that a login is from a hijacked computer, or from a foreign country, or from a computer not used previously by the VIP user, the exception for the customer may not be allowed. Such data collection may be performed via various modules, for example by a "front-end" proxy server, or via other modules.

Embodiments of the invention may offer a higher degree of assurance as to an individual's identity, and may reduce the use of stolen identities, stolen identification information, or fictitious identification information in order to fraudulently open financial accounts, gain access to them and withdraw funds from them, or otherwise make use of them.

In one embodiment, if it is determined that the level of risk is above a threshold, the user may be required to provide security or authentication details, for example information in addition to what was provided to initiate the transaction, or other information. After an initial set of security or authentication details is entered (e.g., user identification, password, account information, or other information), the risk level of the user or transaction may be evaluated.

Figure 2:
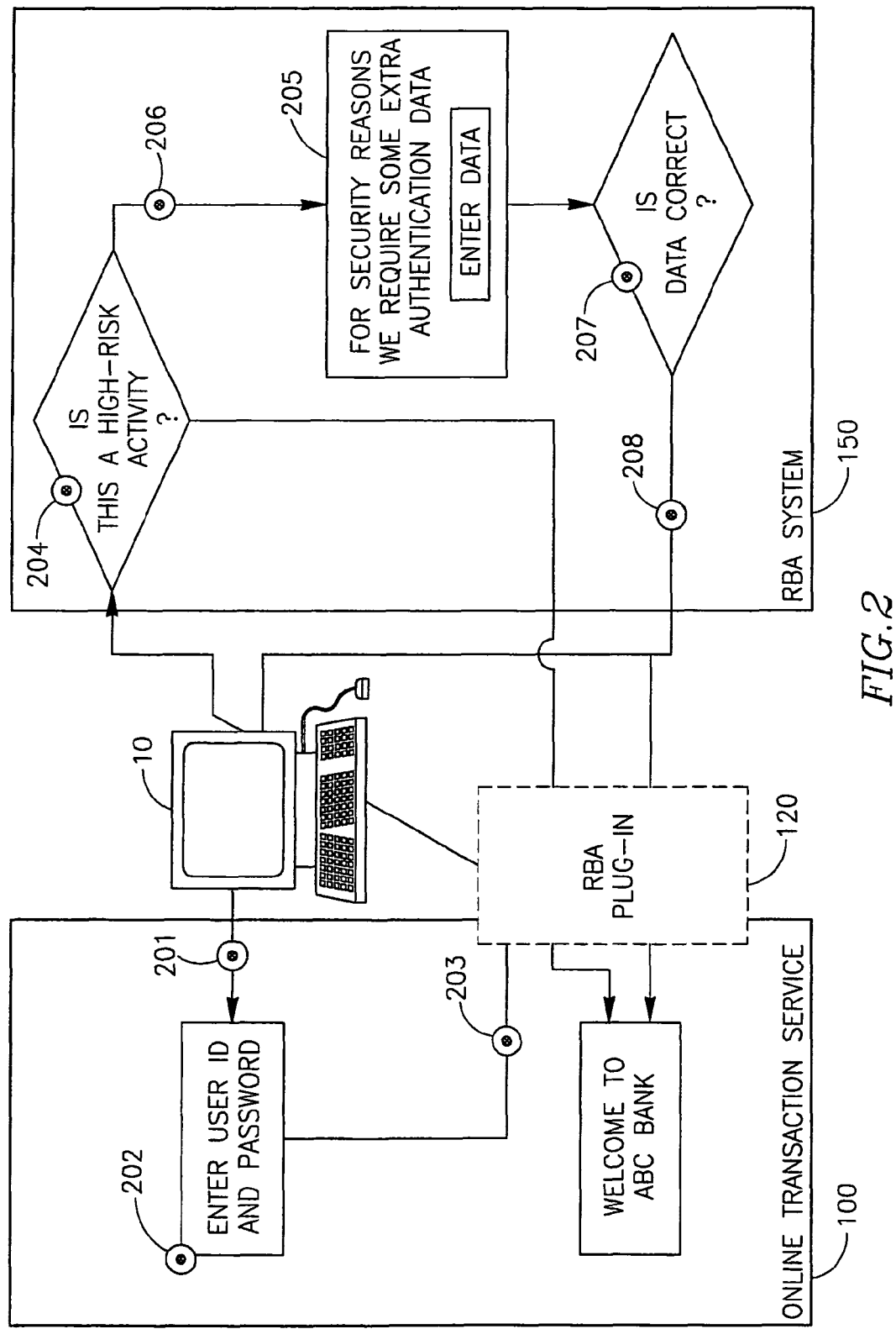
FIG. 2 is a depiction of a high level data flow according to of one embodiment of the invention.

FIG. 2 is a depiction of a high level data flow according to of one embodiment of the invention. Such data flow may, for example, be used with a system similar to that depicted in FIG. 1 or 3, or other suitable systems. A user 10 may navigate to an online transaction login page (operation 201). In operation 202, the user 10 may authenticate (e.g., login, enter identification and password information, etc.) for example in the same the user would without the use of a risk based system. The institution 100 (e.g., an online service provider) may perform the initial authentication using its standard methods. In one embodiment, the risk based authentication local module 120 and/or risk based authentication server 150 do not need to know the user's credentials, logon information, or other information or to process the initial authentication itself—it may simply receive the result of the login from the institution 100. In operation 203, the institution (e.g., via an online service application) may send a request to the risk based authentication local module 120, which may forward the information it to the risk based authentication server 150, via for example the user's web browser or via another method.

In operation 204 the activity (e.g., the login) may be evaluated to see whether it requires further authentication. The risk based authentication server 150 may also decide to collect additional information. In operation 205, if no further authentication is required, the risk based authentication server 150 may communicate with the risk based authentication local module 120 (which may be, for example, a plug-in), e.g. via browser redirection, and standard navigation continues. In operation 206, if there is need for extra authentication, the risk based authentication server 150 may ask the user 10 to perform the authentication in the method selected according to the risk level. In operation 207, the data may be verified. In operation 208, if the data matches, the risk based authentication server 150 may communicate with the risk based authentication local module 120 (e.g., via browser redirection) and the user 10 may be allowed to proceed.

In some embodiments, the transaction currently being evaluated may affect stored data (e.g., transaction data, user data, rules) on which the risk assessment for the transaction currently being evaluated is based. The databases storing such data may be modified based on the current user or transaction, thus the system may include authentication—risk engine feedback. The risk engine or risk determination process may be altered in real-time based on the authentication result after an authentication challenge is presented. For example when fraud is suspected the security requirement may be raised, and the user may be asked for additional authentication. Based on the results of the additional authentication requirement the risk engine or the appropriate databases may be updated and fine-tuned.

Figure 3:
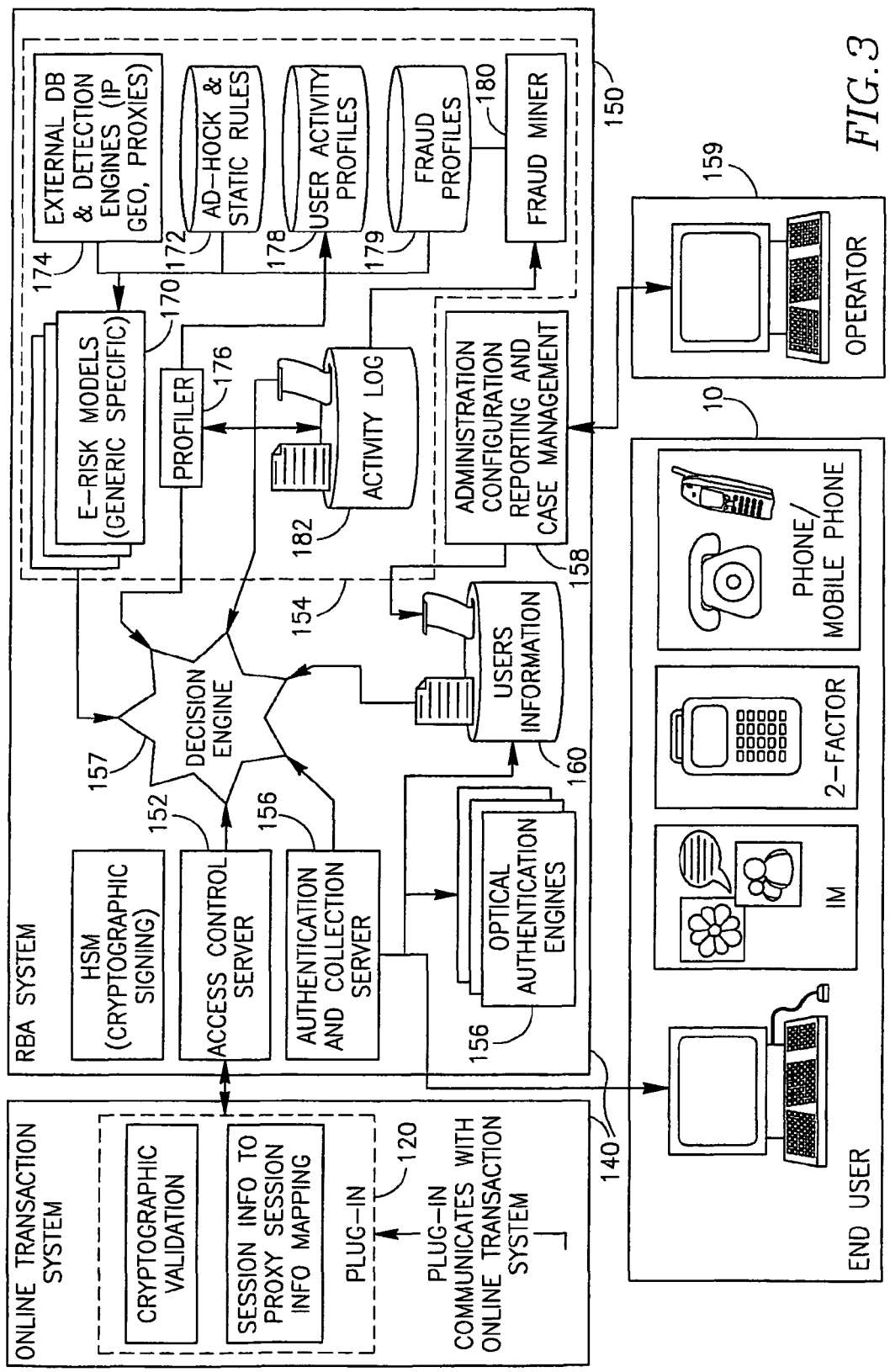
FIG. 3 depicts a risk based authentication system according to one embodiment of the present invention.

FIG. 3 depicts a risk based authentication system according to one embodiment of the present invention. While a specific structure with specific modules is shown, other suitable structures may be used, having different functionality. For example, a risk based system separate from an institution requiring the risk based analysis need not be used; such functionality may be performed at an institution, or possibly by human personnel.

Referring to FIG. 3, an overall risk based authentication system 140 may include a risk based authentication local module 120 (which may be for example, a plug in) and a risk based authentication server 150. Risk based authentication local module 120 may include, for example, cryptographic validation capability, and the capability to map session information to proxy session information. The risk based authentication local module 120 may interface with the transaction system of an institution, and may allow the transaction system to communication with a separate or remote authentication system. A user information database 160 may include, for example, user information (e.g., name, telephone number, etc.). A transaction provider or intuition may provide such information to the user information database 160, and/or data may be obtained via other sources.

A decision engine 157 may for example receive a risk score, examine which authentication options are available, and decide what action to take. The institution or service provider may be able to configure the decision engine 157 and alter its decision thresholds. Other control aspects that a decision engine 157 may take part in can include, for example making an optional authentication step mandatory, or vice versa, adding an additional authentication step to one already performed, not to authenticate at all, possibly regardless or risk level, for example base on some override factor such as a user being in a VIP or other list, postponing authentication to a later time, disallowing self service profile change activities, such as password recovery, address change etc. For example, self service password recovery may be disallowed if the user is browsing from a "risky" location. A VIP or special user may be required to authenticate only if, for example, a risky operation is performed or the authentication is performed during off hours or not in the middle of the day.

The functionality of decision engine 157 or other modules may be executed in different suitable manners, for example by using software executing on processors, such as processor or controller 112 or 132.

Risk based authentication server 150 and risk based authentication local module 120 may communicate, for example, via an access control server 152, which may be associated with a cryptographic signing module. A risk scoring module 154 may, for example, score the risk of an activity, based on for example various sources of information such as the user-computer mapping, deceive fingerprinting, velocity checks, specific users' activity profiles and histories, IP geo-location and IP hijacking detection, or additional or other sources. The risk scoring module 154 may for example track and update a user profile for both generic Internet access and activity specific usage for future risk scoring.

The risk scoring module 154 may include or be associated with one or more E-risk models 170, a database including a set of rules 172 (e.g., ad hoc, static, etc), a set of external database and detection engines 174, a profiler 176, a database including a set of user activity profiles 178, a database including a set of fraud profiles 179, and a fraud miner 180. Other components or sets of components may be used. The user activity database 178 may include, for example, the accumulated information about each user in the system. The profiler 176 may, for example, update the user activity database 178. Profiles in the user activity database 178 may include, for example, generic and/or action specific data. The various databases may be implemented in known manners, and may be spread among one or more databases. Other databases may be used, and other information may be stored.

E-risk models 170 may include, for example, generic or action specific models, which may receive as input information from an on-line transaction (e.g., via authentication local module 120), and may provide output, for example to the decision engine 157. The set of rules 172 may be used, for example, in case specific fraud cases are revealed or suspected. An activity log 182 may contain a detailed log of all activities of the overall system, and may serve as a database for statistical analysis. External database and detection engines 174 may be additional databases or modules such as for example IP geo-location databases, and hijacked IP address detection capability.

The fraud miner 180 or another suitable unit may collect information about specific fraudsters, and may update the fraud profiles database 179 with such information. The fraud miner 180 may use information from the activity log 182, and may detect fraud profiles based on for example past activities and decisions, as well as inputs from institutions such as banks on actual fraud. In some embodiments, institutions or transaction providers may transmit information, for example past activity information (e.g., information developed prior to the implementation of the risk based authentication server 150), information on users reporting fraud, etc. directly to databases such as the user activity database 178. In such a manner bogus user profiles may be deleted, and fraudulent activities marked to, for example, create new rules.

One or more authentication modules, servers or engines 156 may for example include the capability to communicate with users, for example using an infrastructure or capability for communication with a user's browser or other terminal software, instant messaging software, cellular device or telephone, etc., to support various levels of authentication, which are determined according to the risk score. The adaptive authentication module 156 may proactively ask a user to supply additional information that may be needed for future authentications. The decision engine 157 may for example receive a risk score, examine which authentication options are available, and decide what action to take. The institution or service provider may be able to configure the decision engine 157 and alter its decision thresholds. An administration utility 158 may be for example a back-office application, which may for example enable administration, configuration, reporting and case investigations. Administration utility 158 may for example communicate with one or more operators 159. A database 160 may include, for example, user information, rules, etc.

The functionality of various components, such as the risk based authentication system 140, risk based authentication server 150, access control server 152, risk scoring module 154, adaptive authentication module 156, decision engine 157, and/or administration utility 158 may be performed by suitable computing devices such as processor or controller 132, or if computation is more dispersed, by a combination of processor or controller 112 and/or processor or controller 132, or other modules. Various steps of methods according to embodiments of the present invention may also be carried out by personnel at one of the institutions or facilities described.

In other embodiments, the functionality of the risk based authentication system may be divided among other components. For example, a risk based authentication local module 120 need not be required, and much or all of the functionality of a risk based authentication system may be located at a customer or an institution.

As referred to in this description of the invention the term "Transaction" or "Transactions" may refer to any of the following non-limiting examples of online or other transactions, interactions, enrollment to a service, re-enrollment and password recovery using some sort of authentication/challenge or use of various services. It should be noted that the term Transaction is applicable not only to "financial" transactions but to any transaction involving authentication. For example, without limitation, it refers not only to transactions such as an online banking login, but also to a company extranet login. It should be applicable to any transaction where the user is being authenticated by some means, regardless of the purpose of the authentication. Without limiting the foregoing, the following list illustrates certain types of transactions it may apply to: (1) Online enrolment, such as financial account opening: banking, brokerage, and insurance; subscriptions for example for ISP, data and informational content deliveries; customer service enrolment; enrollment to Programs (partnership, MLM, beta, etc.) and any other similar type of transaction; (2) Online transactions such as Online Purchasing, B2B, B2c and C2C transactions; Electronic Bill payment; Internet ACH providers; Money transfers between accounts; Online brokerage trading; Online insurance payments; Certain online banking transactions; Tax filing or Any other similar type of transaction; (3) Online Applications such as for credit cards; loans; memberships; patent applications or information; Governmental applications or other similar type of transactions; (4) Online password resetting, as well as online change or update to personal data by re-authentication/re-enrollment; by combining a mechanism involving secret questions; or by a combination of the above; (5) any login to a restricted service, or other operations that involve an element of risk. Other suitable transactions may be included as well.

Embodiments of the current invention may enable providers (which may be referred to herein for example as institutions or Transaction Providers) of services or Transactions to better and more securely authenticate the identity of the individual or company which is attempting to access such service or perform such transaction (which may be referred to herein for example as an applicant or Transaction Performer, or user), by for example assessing the risk level of the specific transaction and adapting the level of required authentication to the transaction risk level. Such evaluation, or the guidance or control of such authentication, may be performed, for example, by the risk based authentication server 150 and/or risk based authentication local module 120

Although following assessment, it is possible to assess the level of risk presented by a certain Transaction, currently providers still insist on a fixed level of security. Based on an embodiment of the invention, Transaction providers may for example adjust the level and quality of authentication based on the estimated risk level of a given transaction. For transactions whose estimated risk is low, authentication security level may be reduced, and for those whose estimated risk is high, the authentication security level may be increased. The level of security of the authentication may be adjusted "on the fly" (e.g. while the Transaction is taking place). In one embodiment of the invention, a Transaction provider may implement a certain level of authentication that applies to all transactions, and then only for transactions whose risk has been determined to be different from a certain threshold or risk level, require a different level of authentication. Without limiting the foregoing, an example to such an embodiment would be an online banking service, which requires all users to submit a user name and password in order to access or use the service, however, upon determination that the access or use of the service involve greater risk, the user performing such transaction would be required to perform an additional authentication step.

Therefore a process according to some embodiments may assess the risk of each given Transaction, and require accordingly an appropriate level of authentication.

In certain embodiments of the current invention Transaction risk assessment is based on any of the following criteria, or similar criteria; other suitable criteria may be used. It should be understood by those skilled in this art that this list can be tailored and expanded depending on the type, and nature of the Transaction, as well as the availability of information regarding the Transaction. (1) The use of "negative" and "positive" lists. These lists can be defined based on any information relevant to a certain type of Transaction. Such information may include, but is not limited to: IP addresses and their derived information (location, organization etc), source, address, user, account information, product type, transaction amount, time in day, day in week, type of account, date of birth, velocity of Transactions, account number, device ID/fingerprint; Hijacked computer/Trojan infected computer indicator, or other suitable information, as well as any combination of such criteria. A "negative list" may be a list of "riskier" elements—a match of a given data element to a negative list indicates the transaction is probably riskier. A "positive list" may be a list of "safer" elements—a match of a given data element to a positive list indicates the transaction is probably safer. "Negative" and "positive" lists can be constructed manually or populated automatically by some other process that recognizes criteria, ranges of information sets, and populations with statistic correlation to high/low security. Transaction providers may for example maintain proprietary lists, or may share such lists. (2) The creation of user based or account based transaction profiles for the sake of comparing specific transactions to that profile (where such profile may include for example but not limited to information about IP address, source, address, user, typical timing (hour and/or day) of transactions). Divergence of the profile of specific transactions from the profile could indicate a higher level of risk. (3) The creation of a merchant or service provider transaction profiles, and comparing specific Transactions to that profile. A "merchant or service provider profile" may be for example an aggregate profile of all users of a specific merchant or service provider (service provider may mean for example an issuer). For example—if 99.9% of the users of a specific merchant are located in the US, then a transaction from France might be considered riskier, even if in general France is not considered riskier; (4) Measuring the velocity of Transactions performed by a specific account, or originating from a certain IP address, user or source or made at a certain merchant or service provider. If velocity is above a certain threshold, it may indicate a higher level of risk; (5) Measuring the velocity and/or number of accounts performing Transactions that originate from a certain IP address, source, address, user, merchant, or service provider. If velocity is above a certain threshold, it would indicate a higher level of risk; (6) Using algorithms developed by various risk scoring service providers, or actually obtaining a risk score from such service. (7) statistical profiling, such as establishing statistical profiles that can be used to determine the risk of a specific transaction (For example IP geo-location matched with geographic data such as postal code, in order to demonstrate statistical profiling: if for example a customer whose postal code is in area A accesses the online banking site from an IP located in Area B, this is a deviation from the statistical profile of users in Area A). Other suitable methods for assessing the risk level of a transaction and/or user may be used.

According to one embodiment of the present invention, the following non limiting set of principles may be used in order to assess the risk of a given transaction: (1) Knowing the customers/users of the service—based on for example profiling techniques, taking into account communication data analyses (IP level data, geo location and ISP identification—data sources), proactive device mapping (encrypted cookies, computer tagging) and profiling of a customer/user's authentication behaviour; (2) Knowing the fraudsters, and pinpointing them based on their special characteristics, by deploying mechanisms such as fingerprinting of hijacked computers, building IP meta-data blacklists, tracking typical fraudster behaviour at an authentication stage and other comparable techniques; (3) Statistical analysis intended to detect suspicious patterns of activities and suspicious deviation from regular behaviour profiles. Other suitable techniques may be used.

According to certain embodiments of the current invention generic Internet access and activity specific profiling can be used in order to assess transaction risk. The generic model includes patterns that are true for all online actions of any given service, and mainly involves tracking access and communication level data. The activity specific models are deployed only when used to in order to protect a specific zone within a given online service. In such a case, patterns that are specific per online activity type may be targeted. For example—in the case of the use of an embodiment of the present invention for improving authentication of online banking service—the generic profiling applies to all login to the service, while the activity specific model would applies to specific activities such as for example funds transfer, profile change, bill payment and more.

The transaction risk assessment may for example be performed prior to performing the initial authentication, during the performance of a transaction or following completion of transaction as follows (it should be noted that the risk assessment can be performed at various stages of a Transaction. It can performed at one such stage, or during more than one stage, or even at all transaction stages): (1) Conducting risk assessment prior to the commencement of the Transaction. When risk assessment is performed at this stage, the initial authentication information request made to the user may be based on the results of the risk assessment, and may vary depending on the risk level. Conducting the risk assessment at this stage will be less sensitive, as there may be less available data at this point to make the assessment, however it may have a better impact on usability than other methods, because it can affect the entire authentication flow; (2) Conducting risk assessment while a Transaction authentication is taking place. When using this approach, an initial level of authentication may be required. Following the submission of initial authentication information the risk level of the Transaction may be reassessed. If the Transaction is deemed risky, additional authentication information may be required. This approach may allow more data to be used in the risk assessment, as more information may be gathered during the initial Transaction authentication attempt; (3) Conducting risk assessment after Transaction authentication is complete. When using this approach, the Transaction will be authenticated. Following authentication, and based on actual operations performed or attempted to be performed, the user may be required to provide additional authentication information. For example, without limitation, if an online banking user that usually only performs balance transfers to a specific account is trying to do a balance transfer to a different account, the system may ask for additional authentication data. This is a case where the Transaction seems riskier because the operation performed after authentication does not match the usual user profile.

According to one embodiment of the current invention, following the assessment of the level of risk of the Transaction, a decision may be made as to whether or not additional security measures are required, and for example a level of authentication for the transaction, or required of a user, may be set or altered. If such measures are required, the level of authentication may need to be adapted to the transaction risk. It should be noted that a wide range of authentication methods could be used, for example according to the following considerations. The different available authentication methods may be prioritised by the Transaction provider. When setting the priorities a method according to some embodiments may consider the pros and cons of each authentication method (For example without limitation—some methods have third party costs while others do not, some have higher failure rates of genuine users, some are exposed to phishing and others are less susceptible, etc). In addition, using each of the authentication methods requires certain user capabilities or certain information to be stored for the specific user (For example without limitation—using shared secrets requires that the user's shared secret is on the Transaction provider's data file, using dynamic PIN via SMS/phone requires having the user's phone number on file and using EMV two factor authentication is only possible if the user ever received the chip card and the reader). Additionally, some of the authentication methods have constraints that prevent from using them in certain environments (For example, without limitation, the dynamic PIN via SMS method may only be used if the IP the user is currently using comes from a country that has sufficiently good cellular infrastructure and SMS delivery times (the list of such countries can also be altered by the Transaction provider)). Following assessment and prioritisation of available authentication methods it may be necessary that the Transaction provider check what constraints it has with respect to deploying each of the methods, and selecting the optimal method that meets the constraints.

According to one embodiment of the current invention a Transaction may opt to use any of the following modes of action: (1) Authentication with fallback, meaning that after failing to complete the most preferred available authentication method for a number of consecutive times (defined by provider) the user may be presented with an alternative authentication method (next one available for the user in priorities list); (2) Authentication without fallback, meaning that after failing to complete the first authentication method for a number of consecutive times (defined by provider) the user may not be presented with alternative authentication methods; (3) No extra authentication at all.

According to one embodiment of the current invention a transaction provider may lower the required threshold of authentication for most transactions and ask for additional data elements only when risk is not low. This means that by using an embodiment of the present invention, a transaction provider may make it easier for most people to use its services, and may make it more difficult only for risky operations or suspected fraud. This can result in reduced attrition and reduced customer service costs.

Without limiting the embodiments of the invention discussed herein, embodiments of the present invention could be used together with for example any of the following additional authentication methods, in order to adapt the level of security or alter the authentication level requirements following assessment of the transaction risk: (1) Shared secrets—using users' shared secrets that are know to the transaction provider (e.g. date of birth or postal code); (2) Time sensitive secrets—asking users to provide a secret that changes in time (e.g. amount of last deposit or withdrawal); (3) Randomised secret questions—asking users to provide answers previously collected from them; (4) Out-of-band authentication methods—delivering a dynamic PIN via an out of band channel such as SMS to a mobile phone, Voice call to a landline or a mobile phone, or Instant messaging; (5) 2-factor authentication—EMV Chip card based authentication/integration with other tokens.

In one embodiment, following the assessment of the risk level of the transaction, The security level of the authentication may be altered and adjusted in for example any of the following methods, or other suitable methods: (i) Requiring more or less information for the purpose of authenticating a particular transaction, depending on its estimated risk level. This adjustment may refer mainly to the number of data elements required; (ii) Insisting or not insisting on certain information elements, based on the risk level of the transaction. In the case of this adjustment, certain information requirements may be made mandatory; (iii) Making a certain security measure mandatory or optional.

In one embodiment of the current invention, a transaction provider may decide based on the risk level of a transaction to forgo any authentication, or alternatively to present all users with an authentication request, but to permit certain users to opt out of the authentication (e.g. authentication would be made optional for such users), or alternatively make authentication optional for all users, but make it mandatory only for certain users.

In one embodiment of the present invention the risk of each activity may be estimated using interactive technologies, and the appropriate level of interactive authentication is matched to the specific risk of the transaction, following which the authentication results may be fed back into the risk assessment module. For example, a high velocity of transactions is detected coming from a previously unrecorded IP proxy. This can indicate a fraudster who uses a specific server for conducting fraud on multiple accounts, or possibly a genuine new proxy server. Such information may be fed back to the relevant databases and rule sets in real time. Since risk is higher than normal, the system may initiate an extra authentication step, or may raise the authentication level of the transaction. The authentication results may be fed back into the risk-scoring module. If almost all authentications fail, this may indicate a fraudster and the specific IP may enter a black list; higher levels of authentication (or even automatic decline) may be used. If, however, most authentications pass, this indicates multiple genuine customers using a single proxy server, and the risk engine may be updated accordingly. In the future the risk engine may indicate a normal level of risk for this IP, so the system may stop requiring extra authentication for these transactions—thus reducing "insults" even further.

The following examples of the use of an embodiment of the invention are only examples, which are intended to illustrate specific implementations of the method. They are in no way intended to limit the applicability of this method to a certain field, or to a certain type of Transaction, or even to a certain type of risk assessment method, or to a type of adjustment to the authentication level.

According to one example, an embodiment of the present invention may aid in adjusting the level of authentication during an online banking login, depending on the assessed Transaction risk.

Many banks insist on a very high level of security during login to online accounts, and may require their online users to provide many details (e.g., data elements) each time they wish to login to the online banking service. Such details could include for example: a username, and/or a bank selected password/id number, and/or a user selected password, and/or a user id number (e.g. SSN, national ID number, or any other user specific detail (e.g. name, date of birth, which are known to the user only.)).

Though insisting on a very high level of security may reduce fraud, it is not without costs. The main costs associated with maintaining such a high level of security, are Transaction abandonment, and low usage of online banking, as well as high volumes of calls to customer call centers.

An embodiment of the current invention enables efficiently adjusting the level of security to the level of estimated risk, for example as follows (other operations or series of operations may be used):

1. Define several levels of login security, for example ranging from username and password (or even just password with username auto filled), to the fill list of details otherwise required.

2. Perform a risk assessment (e.g., use a risk assessment engine) to assess the risk of a specific login or Transaction. The process may select the appropriate level of login security according to this level.

3. The details used for a risk assessment may include the following, or may include other suitable sets of details:
   i. Current login details: for example, user identification (which may for example relate to IP information), user location, IP address, IP address geo-location, time and date of the login (both GMT and adjusted to the local time zone), browser, cookies stored on the local computer, online login account, time it takes for the login page to download, time it takes the user to respond (e.g., to submit the login details), time it takes the user to enter the various fields or even the various letter, whether the user had to correct the details while he entered them.
   ii. Registration details (e.g., details from the time the user registered to the service): same as in (a) above
   iii. History login details: same as above in (a).
   iv. Profile of the online activities of the login user (e.g., what activities does the user usually do and when)
   v. Profile of login activities of other users who belong to the same age group, socio-economical group, or other profile group of the user.

The risk assessment can be performed during various stages of the online transaction process. They can be used independently, or they can be combined together. If risk assessment is performed before the login or transaction starts, there may be fewer details at this stage. When using this alternative, the login screen that may be shown to the user may be different and may be chosen based on the risk level. If risk assessment is performed during login or the transaction, the user may initially be presented with a simple username and password or similar login screen. After the user enters his details, the risk level of the login may be reassessed. If the current security level of the login is deemed risky, additional information may be presented for example via the presentation of additional screens. This approach may allow more data to be used in the risk assessment, as more information may be gathered during the login process itself on the first screen. If risk assessment is performed after login, the user may start with a simple login procedure, and may be allowed to enter, if the user enters the simple details correctly. Then based on the actual operations he tries to perform, and on the overall risk level of the session, the user might be redirected to additional login screens requiring additional details. While the use of screens to obtain information is discusses, other methods may be used, for example paper, telephone, face to face interaction, etc. The risk assessment can be done using a variety of methods, including, for example:
   vi. Negative and positive lists of details, such as IPs, geo-locations, online accounts, dates, days of the week/month, hours of the day
   vii. Comparison of the login data to the specific user login (or online activity) profile (based on past logins and or other online activities) and/or to a generic user login profile.

4. Various suitable implementations may be used. An example which may be suitable for the cases where the risk assessment is performed either before or during the login, is as follows: a "front-end" proxy server may be added, so that it may cache the user's full login details. This proxy server may do the risk assessment (either itself or using an external risk assessment engine), may decide what screens to show, and may present the actual screens to the user. It may then fill in the missing login details (the ones the user did not fill) and submit the requests to the "back-end" site. The proxy may collect and store "on the fly" the data from the user based on the approval it gets from the "back-end" site. The proxy server can also validate data internally in case it already has all the required data. The backend site can either be the site as it was before the "adaptive login" feature was added or an internal component that the "old" site was using for authentication before.

In another example an embodiment may make a decision between for example mandatory and optional "activation on the fly" (aka., "AOF", "Registration On Demand"="ROD", ADS) for a system such as the 3D Secure™. 3D Secure™ (aka "Verified by Visa Standard") is an authentication standard, which may permit a card issuer to authenticate the identity of the card member during an online Transaction (typically an online card purchase transaction, although it could be used for the sake of authentication other transactions as well); other suitable systems may be used as well. Card issuers can require users to pre-register to such service, but can also offer registration to the service, during an online transaction (e.g. activation of the 3D Secure™ service on the fly "AOF"). Card issuers can for example make this service and the registration to this service optional to their card members, or mandatory, and accordingly can make the registration via AOF mandatory or optional. Making the registration optional versus mandatory may mean that authentication based on the service is also optional or mandatory. Optional AOF may permit that the card member can elect not to register to the service, and may still be permitted to complete the online purchase (or other transaction) without the 3D Secure™ authentication. Making AOF mandatory means that the user may be obliged to register to the 3D Secure™ service, and authenticate himself or herself in order to be permitted to conclude the transaction. Optional AOF may not sufficiently protect the card issuer against fraud, while mandatory AOF may cause many card members to abandon their online transaction, if they do not wish to enroll to the authentication service. Embodiments of the invention may enable an organization or a process decide whether AOF should be optional or mandatory based on the individual risk of the transaction.

The details for the risk assessment or transactions can include for example the following:

viii. Current login details: IP address, IP address geo-location, time and date of the login (both GMT and adjusted to the local time zone), browser, cookies stored on the local computer, online login account, time it takes for the login page to download, time it takes the user to respond (to submit the login details), time it takes the user to enter the various fields or even the various letter, whether the user had to correct the details while he entered them.

ix. Registration details (details from the time the user registered to the service): same as in (a) above x. History login details: same as above in (a).

xi. Profile of the online activities of the login user (e.g.— what activities does the user usually do and when)

xii. Profile of login activities of other users who belong to the same age group, socio-economical group, or other profile group of the user xiii. Merchant name, Merchant URL, Merchant acquirer BIN and Merchant ID, Merchant country, Merchant GMT offset (all from the PAReq)

xiv. Purchase currency and amount (from PAReq)

xv. Merchant TermURL and HTTP Referrer (two fields which can show which site has submitted the 3-D Secure PAReq to us, and which site is to get the PARes from us).

xvi. Profile of the merchant and profile of users buying in this merchant

In another embodiment, part or all of a transaction may be a password or other data recovery, where for example a user or applicant requires a password (e.g., because the password has been forgotten or misplaced) or a password is reset or changed by the user. For example, a password to an online account may be sent via email to a user after the user answers a secret question. The level of risk may not affect a primary authentication (e.g., logging in to an account, etc.) but rather affect password recovery, or any other recovery of a secret related to the primary authentication. Risk may affect the recovery by for example imposing an additional requirement as a condition for resetting, altering or revealing the password or other data. If risk is determined to be low the user may be allowed more access to password information, or for example to perform self service password recovery. If the risk is determined to be higher a user may be for example required to engage in different activities, or the password transaction may be altered so that, for example, the user must contact a customer service representative.

For example, if a risk assessment in a transaction or for a user is low or below a certain threshold, the user may be allowed to use a fixed set of common data elements (e.g., such as SSN, date of birth, phone number, driver's license number, CVV2 code, PIN code, etc.) for password recovery, but may be required to use a different stronger form of authentication for password recovery if the risk level is high. If risk determination is low the user may be allowed to use a fixed set of common data elements for password recovery, but if the risk level is high or over a certain threshold, a new password or other data item may be sent to the original user via a previously established channel (e.g., to the user's email on file, billing address, etc.).

Figure 4:
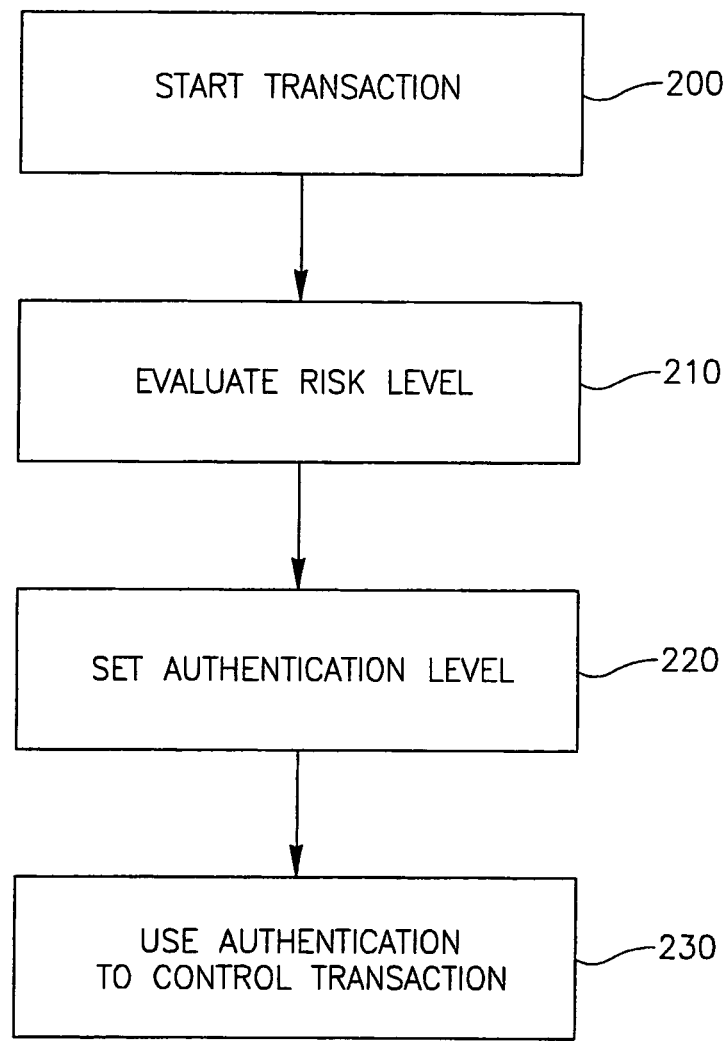
FIG. 4 is a flowchart depicting a process according to an embodiment of the present invention.

FIG. 4 is a flowchart depicting a process according to an embodiment of the present invention. FIG. 4 may be effected by, for example, the embodiments shown in FIGS. 1 and 3, but may be effected by other suitable systems. Referring to FIG. 4, in operation 200, a user starts a transaction; for example, a user requests to open an account at or purchase goods from an institution. In operation 210, the risk level of the transaction and/or user may be evaluated or otherwise determined; for example, by the institution, or by a separate service such as for example risk based authentication server 150. In operation 220, based on the risk level, a level of authentication for the transaction may be set. In operation 230, the level of authentication may be used to, for example determine a set of authentication details required of a party to the transaction, or possibly to choose among a set of levels of security, for example logging security, for the transaction. For example, more or less information or details may be required of the user based on the level of authentication. After the level of authentication or the risk level for the transaction is set, user authentication may be performed. Other operations or series of operations may be used.

Figure 5:
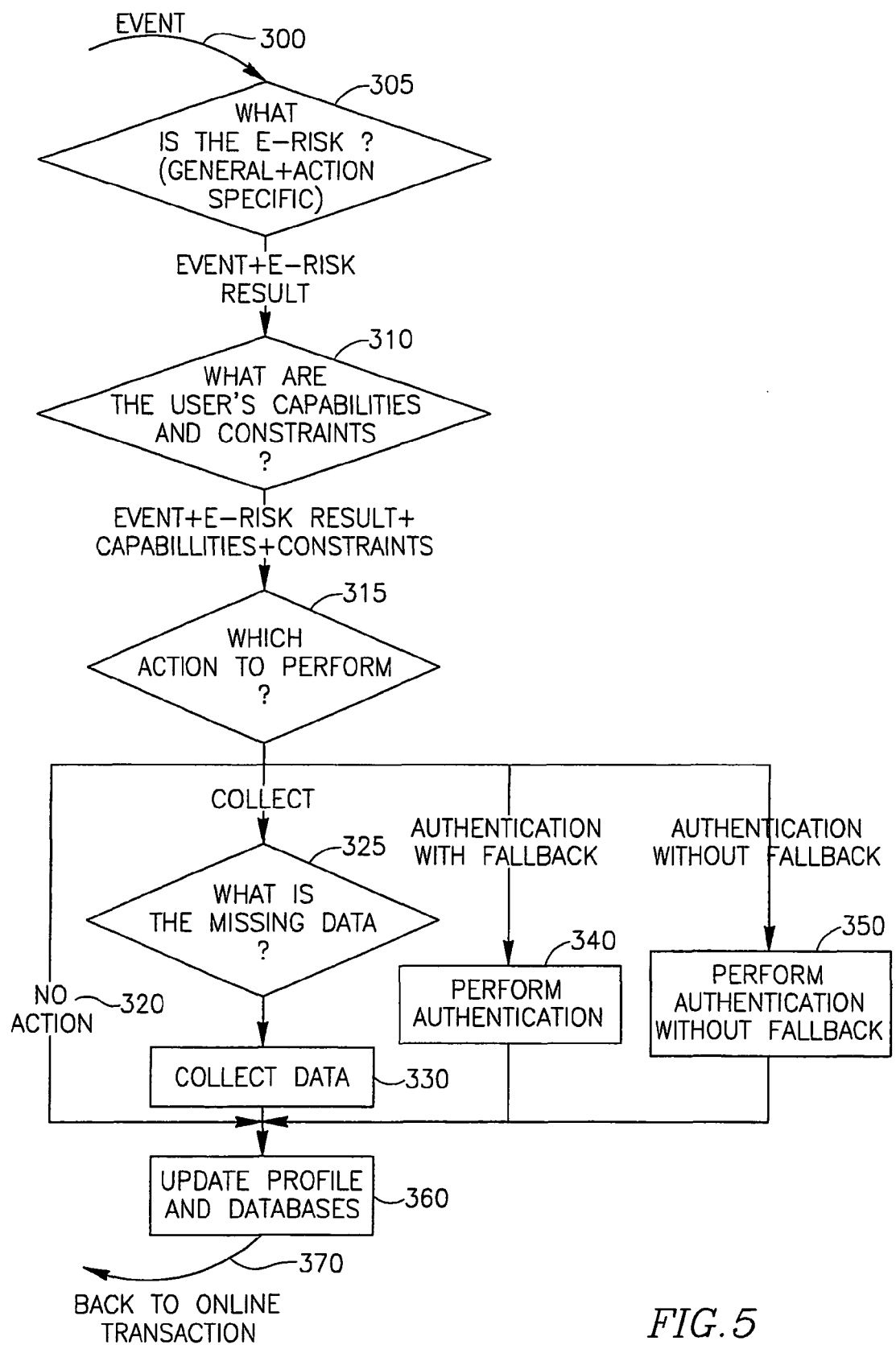
FIG. 5 is a flowchart depicting a process according to an embodiment of the present invention.

FIG. 5 is a flowchart depicting a process according to an embodiment of the present invention. FIG. 5 may be effected by, for example, the embodiments shown in FIGS. 1 and 3, but may be effected by other suitable systems. Referring to FIG. 5, in operation 300, a decision engine or another entity may receive event details from for example, an access control server. The decision engine may communicate with for example a risk module and request the event's risk score. In operation 305, the risk module may use for example risk models (e.g., generic and specific), run an analysis of the event, and may return a risk score.

In operation 310, the decision engine may take the risk score, and may consult a user information database and the specific constraints to determine what are the available authentication methods. In operation 315, the decision engine may check the available authentication methods and the risk score against the configuration tables and decide what action to take. In operation 320, if no action is to take place the decision engine may skip to operation 360. In operation 325, if user information collection is to take place, the authentication and collection server may query the user information database to determine data is missing, and may consult the appropriate configuration table to decide which element(s) to collect. After data collection is complete the user information a database (e.g., database 160) may be updated. In operation 330, if authentication is to take place, an authentication and collection server may for example display a page requesting the customer or user to perform another level of authentication; for example enter more information. The authentication and collection server may verify the data entered.

In operation 340, in case of authentication with fallback, fallback may be offered after the user failed authentication a certain number of times. In operation 350, in the case of authentication without fallback, fallback is not offered after the user failed authentication a certain number of times. In operation 360, a module such as, for example, profiler 176 may update relevant databases, for example, user activity database 178. In operation 370, the access control server sends the response. Other operations or series of operations may be used.

The examples shown in FIGS. 4 and 5 are examples only; other operations or series of operations may be used, and other methods for evaluating a user or applicant and interacting with the user or applicant may be used. In other embodiments, the Internet or web pages need not be used—interaction may be, for example, telephone, face to face, via an automated teller machine, or via other methods.

It will be appreciated by persons skilled in the art that embodiments of the invention are not limited by what has been particularly shown and described hereinabove. Rather the scope of at least one embodiment of the invention is defined by the claims below.

What is claimed is:

1. A method performed by a computer processor of a risk based authentication server, the method comprising:
   receiving, from an online transaction server which has performed a first authentication operation to successfully authenticate a party using a remote user computer, user identification data which identifies the party using the remote user computer, the computer processor of the risk based authentication server being separate from the online transaction server and communicating with the online transaction server through an interface;
   receiving, from the online transaction server, a risk assessment request including transaction information obtained from the party using the user computer in response to a request to perform a transaction;
   assessing, by the computer processor, the risk level of the transaction based on the user identification data and the transaction information of the risk assessment request;
   based on the risk level, setting a level of authentication for the transaction,
   wherein assessing the risk level of the transaction includes at least evaluating based on at least one circumstance of the requested transaction the probability that the party requesting the transaction is not a person identified by the user identification data,
   wherein said at least one circumstance of the requested transaction is selected from: an identity of the user computer, a time of the transaction request, and a geographical location of the user computer;
   determining based on the level of authentication a set of one or more additional authentication details required of the party requesting the transaction, said one or more additional authentication details being different from the user identification data;
   requesting the determined set of additional authentication details from the party through the online transaction server via a web-based exchange with the party using the user computer;
   receiving from the party responses to the request for the determined set of additional authentication details through the online transaction server via the web-based exchange with the party using the user computer; and
   based on said party's responses to the request for the determined set of additional authentication details, performing a second authentication operation by the computer processor of the risk based authentication server which is separate from the online transaction server that has performed the first authentication operation and which communicates with the online transaction server through the interface, the second authentication operation determining whether to output a successful authentication result from the risk based authentication server to the online transaction server to allow the online transaction server to perform the transaction.

2. The method of claim 1, wherein the party is login authenticated by the online transaction server prior to assessing the risk level of the transaction.

3. The method of claim 1, wherein the set of additional authentication details includes at least a password.

4. The method of claim 1, wherein setting the level of authentication for the transaction includes choosing among a set of levels of login security for the transaction, based on the risk level.

5. The method of claim 1, further comprising setting, the level of authentication after the start of transaction.

6. The method of claim 1, wherein the transaction is a financial transaction.

7. The method of claim 1, wherein assessing the risk level of the transaction includes at least evaluating the transaction.

8. The method of claim 1, wherein assessing the risk level of the transaction includes at least evaluating size of the transaction.

9. The method of claim 1, wherein the risk level assessment is based on a set of stored data; and wherein the method further comprises altering the set of stored data based on the transaction.

10. The method of claim 1, wherein determining the set of one or more additional authentication results includes selecting a type of authentication required of the party requesting the transaction.

11. The method of claim 1, further comprising, in response to a certain risk level, requiring a further authentication step after an initial authentication step.

12. The method of claim 1, further comprising, in response to a certain risk level, making a certain authentication step mandatory instead of optional.

13. The method of claim 1, wherein the transaction is a password recovery.

14. The method of claim 1, further comprising overriding the level of authentication which is set for the transaction.

15. The method of claim 1, further comprising if the party is among a set of predefined users, or the transaction meets certain criteria, overriding the level of authentication which is set for the transaction.

16. The method of claim 1, further comprising collecting user or transaction data and storing the data for future risk assessment.

17. The method of claim 1, further comprising collecting user data and storing the data for future authentication.

18. The method of claim 1, further comprising collecting transaction data and storing the transaction data for future risk assessment.

19. The method of claim 17, further comprising authenticating a party to the transaction.

20. The method of claim 1, wherein the set of additional authentication details consist of one or more authentication details selected from: a social security number, an answer to a security question, an answer to a question based on collected data, a transaction number relating to a recent transaction of the party, and data provided to the party over a different communication channel.

21. The method of claim 1, further comprising if the level of risk is above the threshold, determining which additional authentication options are available, wherein the one or more additional authentication details are selected from among the determined available authentication options.

22. A method performed by a computer processor of a risk based authentication server, the method comprising:
    accepting, from an online transaction server which has performed a first authentication operation to successfully authenticate a user using a remote user computer, (i) user identification data which identifies the user using the remote user computer, and (ii) a request to begin a transaction, the computer processor of the risk based authentication server being separate from the online transaction server and communicating with the online transaction server through an interface;
    evaluating, by the computer processor and based on the user identification data and at least one circumstance of the requested transaction, a level of risk for the transaction, wherein the level of risk includes at least a probability that the user is not a person identified by the user identification, wherein said at least one circumstance of the requested transaction is selected from: an identity of the user computer, a time of the transaction request, and a geographical location of the user computer;
    if a second authentication operation performed by the risk based authentication server indicates that the level of risk is below a threshold, directing the online transaction server to allow the transaction;
    if the second authentication operation performed by the risk based authentication server indicates that the level of risk is above the threshold, directing the online transaction server to request the user to provide one or more additional security details, receive from the user a response to the request for security details, and based on the user's responses to the request for security details, determine whether to allow the transaction, wherein said one or more additional security details are different from information provided by the user prior to the request to begin the transaction.

23. The method of claim 22, wherein accepting the request includes at least accepting an initial set of authentication details.

24. The method of claim 22, further comprising, prior to accepting the request, accepting from the user authentication details.

25. The method of claim 22, wherein evaluating the level of risk for the transaction includes at least evaluating the past transaction history of the person identified by the user identification.

26. The method of claim 22, further comprising if the user is among a set of predefined users, overriding requiring the user to provide additional security details.

27. The method of claim 22, wherein the set of additional security details comprises a password.

28. The method of claim 22, wherein the set of additional security details consist of one or more security details selected from: a social security number, an answer to a security question, an answer to a question based on collected data, a transaction number relating to a recent transaction of the user, data provided to the user over a different communication channel.

29. The method of claim 22, further comprising if the level of risk is above the threshold, determining which additional security options are available, wherein the one or more additional security details are selected from among the determined available security options.

30. A risk based authentication server comprising a computer processor to:
    receive from an online transaction server which has performed a first authentication operation to successfully authenticate a party using a remote user computer, user identification data which identifies the party using the remote user computer, the computer processor of the risk based authentication server being separate from the online transaction server and communicating with the online transaction server through an interface;
    receive, from the online transaction server, a risk assessment request including transaction information obtained from the party using the user computer in response to a request to perform a transaction;
    assess the risk level of the transaction based on the user identification data and the transaction information of the risk assessment request; and
    based on the risk level, set a level of authentication for the transaction,
    wherein said processor, when assessing the risk level of the transaction, at least evaluates based on at least one circumstance of the requested transaction the probability that the party requesting the transaction is not a person identified by the user identification, wherein said at least one circumstance of the requested transaction is selected from: an identity of the user computer, a time of the transaction request, and a geographical location of the user computer;
    determine based on the level of authentication a set of one or more additional authentication details required of the party requesting the transaction, said one or more additional authentication details being different from the user identification data;
    request the determined set of additional authentication details from the party through the online transaction server via a web-based exchange with the party using the user computer;
    receive from the party responses to the request for the determined set of authentication details through the online transaction server via the web-based exchange with the party using the user computer; and
    based on said party's responses to the request for the determined set of authentication details, perform a second authentication operation to determine whether to output a successful authentication result from the risk based authentication server to the online transaction server to allow the online transaction server to perform the transaction.

31. The risk based authentication server of claim 30, wherein the processor is to authenticate a party to the transaction.

32. The risk based authentication server of claim 30, wherein the processor is to use the level of authentication to determine a set of authentication details required of a party to the transaction.

33. The risk based authentication server of claim 30, wherein the set of additional authentication details includes at least a password.

34. The risk based authentication server of claim 30, wherein the processor is to choose among a set of levels of login security for the transaction, based on the risk level.

35. The risk based authentication server of claim 30, wherein the processor is to in response to a certain risk level, require a further authentication step after an initial authentication step.

36. The risk based authentication server of claim 30, wherein the transaction is a password recovery.

37. The risk based authentication server of claim 30, wherein the set of additional authentication details consist of one or more authentication details selected from: a social security number, an answer to a security question, an answer to a question based on collected data, a transaction number relating to a recent transaction of the party, data provided to the party over a different communication channel.

38. The risk based authentication server of claim 30, wherein the computer processor is to determine which additional authentication options are available, and determine the set of one or more additional authentication details based on the determined available additional authentication options and on the level of authentication.

39. A risk based authentication server comprising a computer processor to:
accept, from an online transaction server which has performed a first authentication operation to successfully authenticate a user using a remote user computer, (i) user identification data which identifies the user using the remote computer, and (ii) a request to begin a transaction, the computer processor of the risk based authentication server being separate from the online transaction server and communicating with the online transaction server through an interface;
evaluate based on the user identification data and at least one circumstance of the requested transaction a level of risk for the transaction, wherein the level of risk includes at least a probability that the user is not a person identified by the user identification, wherein said at least one circumstance of the requested transaction is selected from: an identity of the user computer, a time of the transaction request, and a geographical location of the user computer;
if a second authentication operation performed by the risk based authentication server indicates that the level of risk is below a threshold, direct the online transaction server to allow the transaction; and
if the second authentication operation performed by the risk based authentication server indicates that the level of risk is above the threshold, direct the online transaction server to request the user to provide one or more additional security details, receive from the user a response to the request for security details, and based on the user's responses to the request for security details, determine whether to allow the transaction, wherein said one or more additional authentication details are different from information provided by the user prior to the request to begin the transaction.

40. The risk based authentication server of claim 39, wherein accepting the request includes at least accepting an initial set of security details.

41. The risk based authentication server of claim 39, wherein evaluating at least the user for risk includes at least evaluating the past transaction history of the user.

42. The risk based authentication server of claim 39, wherein the processor is to, if the user is among a set of preferred users, override the requiring the user to provide security details.

43. The risk based authentication server of claim 39, wherein said processor is further to evaluate the transaction for a level of risk.

44. The risk based authentication server of claim 39, wherein the set of additional security details comprises a password.

45. The risk based authentication server of claim 39, wherein the set of additional security details consist of one or more security details selected from: a social security number, an answer to a security question, an answer to a question based on collected data, a transaction number relating to a recent transaction of the user, data provided to the user over a different communication channel.

46. The risk based authentication server of claim 39, wherein the computer processor is to determine which additional security options are available, and determine the set of one or more additional security details based on the determined available additional security options and on the level of authentication.

* * * * *